United States Patent
Kroes et al.

(10) Patent No.: US 6,841,252 B2
(45) Date of Patent: Jan. 11, 2005

(54) LAMINATE AND PROCESS FOR PRODUCING A LAMINATE OF THIS TYPE

(75) Inventors: Michael Theodorus Kroes, Raalte (NL); Andries Cornelis De Muijnck, Heiloo (NL); Hendrik Bart Van Veldhuizen, Beverwijk (NL)

(73) Assignee: Corus Staal BV, Ijmuiden (NL)

( * ) Notice: Subject to any disclaimer, the term of this patent is extended or adjusted under 35 U.S.C. 154(b) by 0 days.

(21) Appl. No.: 10/181,156

(22) PCT Filed: Jan. 19, 2001

(86) PCT No.: PCT/EP01/00813

§ 371 (c)(1),
(2), (4) Date: Feb. 26, 2003

(87) PCT Pub. No.: WO01/53072

PCT Pub. Date: Jul. 26, 2001

(65) Prior Publication Data

US 2003/0162049 A1 Aug. 28, 2003

(30) Foreign Application Priority Data

Jan. 19, 2000 (NL) .............................. 1014112

(51) Int. Cl.$^7$ ................ B32B 15/08; C09J 163/00; C09J 163/02; C09J 171/12
(52) U.S. Cl. .................. 428/416; 156/330; 428/418
(58) Field of Search ................. 428/416, 418; 156/330; 525/523

(56) References Cited

U.S. PATENT DOCUMENTS

| | | | | |
|---|---|---|---|---|
| 4,330,587 A | * | 5/1982 | Woodbrey | 428/215 |
| 4,424,254 A | * | 1/1984 | Hedrick et al. | 428/215 |
| 5,043,367 A | * | 8/1991 | Hallgren et al. | 523/429 |
| 6,349,747 B1 | * | 2/2002 | Camberlin et al. | 138/141 |
| 6,652,962 B1 | * | 11/2003 | Sato et al. | 428/352 |
| 2002/0147283 A1 | * | 10/2002 | Kim et al. | 525/423 |

FOREIGN PATENT DOCUMENTS

| | | |
|---|---|---|
| EP | 0312150 | 4/1989 |
| EP | 0598428 | 5/1994 |
| JP | 1-153746 A * | 6/1989 |
| WO | 93/22135 | 11/1993 |

OTHER PUBLICATIONS

Derwent accession No. 1989–216518 for Japanese Patent No. 1–153746.*
R.W. Venderbosch, H.E.H. Meijer and P.J. Lemstra, Processing of Intractable Polymers Using Reactive Solvents: 2. Poly (2, 6–dimethyl–1, 4–phenylene ether) as a Matrix Material for High Performance Composites, 1995, vol. 36, No. 6, pp. 1167–1178.

* cited by examiner

*Primary Examiner*—Robert Sellers
(74) *Attorney, Agent, or Firm*—Stevens, Davis, Miller & Mosher, LLP

(57) ABSTRACT

The invention relates to a laminate, comprising a plastic layer which contains a thermoplastic, which plastic layer is joined at least on one side to a substantially parallel metal skin. The invention also relates to a metal-plastic-metal laminate of this type. According to the invention, the core layer includes, in addition to the thermoplastic, a solvent and a hardener, the thermoplastic being dissolved in the solvent to make the thermoplastic processible, during production of the laminate, at a temperature lower than the glass transition temperature of the thermoplastic, and the hardener being capable of reaction with the solvent, or the core layer includes polymer particles dispersed in the thermoplastic, which polymer particles are formed from a solvent and a hardener capable of reaction with the solvent. In this way, the core layer becomes easier to work during the production of the laminate, while the laminate itself, after cold-working, is dimensionally stable at elevated temperature. The invention also relates to a process for producing a laminate of this type.

35 Claims, 1 Drawing Sheet

LAMINATE AND PROCESS FOR PRODUCING A LAMINATE OF THIS TYPE

The invention relates to a metal-plastic-metal laminate, comprising a core layer containing a thermoplastic, which core layer is situated between two substantially parallel metal skins and is joined thereto. The invention further relates to a laminate comprising a plastic layer which contains a thermoplastic, which plastic layer is joined on one side to a substantially parallel metal skin. The invention further relates to a process for producing a laminate of this type, including a metal-plastic-metal laminate.

Patent Publication EP 0 598 428 describes a metal-plastic-metal laminate. The described laminate comprises two metal skin plates, each with a thickness of between 0.08 and 0.3 mm, between which there is a core layer of solid polypropylene (PP) with a thickness in a range from 0.5 to 2.0 mm, and a layer of adhesive between the core layer and the skin plates. This known laminate can be used as a laminate for producing bodywork parts.

A laminate comprising a thermoplastic containing layer that is joined on one side to a substantially parallel metal skin can be used for certain other bodywork parts.

The processing to form usable products, of the laminate comprising a layer containing a thermoplastic joined to at least one metal skin, such as bodywork parts, structural sheets and structural sections for walls and roofs and other objects, generally comprises cold-working followed by coating of the components. A coating treatment carried out on automobile bodies and components therefor made from steel comprises a cataphoresis treatment, a filler treatment and a topcoat treatment. The cataphoresis treatment usually takes place at 180° C., while a curing step at a temperature of between 180 and 200° C. usually forms part of the topcoat treatment. Mechanical stresses are formed in the laminate as a result of the cold-working.

One requirement for a laminate is that a product produced therefrom, after it has been converted into the desired form, be dimensionally stable during one or more of the subsequent treatments at the corresponding temperatures. The term dimensionally stable is understood as meaning that the laminate, in a test which is described in EP 0 598 428 during which a specimen of the laminate is firstly cold-worked and then, during a subsequent heat treatment at a set temperature, changes in shape by no more than 0.5°.

One drawback of the known metal-plastic-metal laminate is that it is insufficiently dimensionally stable at a temperature of over 145° C. Another drawback of the known laminate is that an additional adhesion layer is always required between the core layer and the metal skins.

It is an object of the invention to provide an improved laminate. It is another object to provide a laminate which is dimensionally stable at a temperature of at least 180° C. It is yet another object to provide a laminate which is suitable for cold-working. It is yet another object of the invention to provide a laminate in which a layer of adhesive is not necessary. It is yet a further object of the invention to provide a laminate which is suitable for producing structural and bodywork parts, and possibly other products into which sheet metal is processed, such as packaging items.

One or more of these objects is achieved with a metal-plastic-metal laminate, comprising a core layer with a thermoplastic, which core layer is situated between two substantially parallel metal skins and is joined thereto, wherein the core layer furthermore comprises a solvent and a hardener, the thermoplastic being dissolved in the solvent, and the hardener being capable of reaction with the solvent.

The solution of the thermoplastic and the solvent has a lower viscosity than the thermoplastic and is therefore easier to process than the thermoplastic itself. The result is a laminate in which the core layer comprising a thermoplastic, at least during production of the laminate, can be processed at a temperature which is lower than the glass transition temperature of the thermoplastic without solvent.

There is a broad choice of plastics which are stable at a high temperature. However, an inherent problem of these stable plastics is that they are difficult to process at these and lower temperatures. The processibility of the laminate according to the invention at lower temperatures is improved by the solvent compared to the laminate in which there is no solvent. Making the solvent react with the hardener to form a reaction product, according to the invention, changes the solvent in such a manner that the plastic is no longer, or at least is less, soluble therein, resulting in a laminate with a higher dimensional stability than the laminate before the reaction took place.

The solvent and the hardener preferably each comprise at least two reactable groups. This ensures that the hardener can be polymerized with the solvent, forming a reaction product which comprises polymer chains.

The reaction product which is formed from the solvent and the hardener is preferably not miscible with the plastic. As a result, when the solvent is reacted with the hardener, the undissolved thermoplastic is formed, with its own properties, since the solvent is separated out of the thermoplastic.

The solvent preferably comprises a low molecular weight epoxy resin. Epoxy resins have proven to be very effective solvents for a large number of thermoplastics. Moreover, epoxy resins are easy to polymerize, with the result that the solvent can easily be removed from the plastic. Moreover, epoxy groups exhibit good adhesion to metal surfaces. The good adhesion of epoxy groups to metal surfaces leads to good adhesion between the core layer and the metal skin without an additional adhesion layer being required. Dispensing with a separate adhesion layer has a beneficial effect on the cost price of the laminate, in particular because the production process is simpler.

The hardener preferably belongs to the group of amines, the group of amides or the group of anhydrides. Hardeners of this type react excellently with epoxy groups. Moreover, hardeners of this type are commercially available, in a broad selection, at favourable prices. The temperature and rate at which these hardeners react with the epoxy groups depend, inter alia, on the type of hardener, so that a suitable laminate according to the invention is possible for various types of applications. For example, with anhydrides epoxy resins usually harden at a temperature which is typically higher than 180° C., so that it is thus possible to achieve a laminate in which the core layer has not yet hardened at lower temperatures and room temperature.

The laminate which has been described hitherto is an intermediate. As long as the plastic is dissolved in the solvent, the laminate does not yet have the high dimensional stability which is ultimately desired.

The invention is also embodied by a laminate, comprising a core layer which contains a thermoplastic, which core layer is situated between two substantially parallel metal skins and is joined thereto, in which metal-plastic-metal laminate the core layer comprises polymer particles which are dispersed in the thermoplastic, which polymer particles are formed from a solvent and a hardener which is capable of reaction with the solvent. The result is a metal-plastic-metal laminate in which the skin plates are joined to one another via a network of uninterrupted paths through the thermoplastic in the core layer, the solvent having been separated out of the thermoplastic. As a result, the ultimately desired dimensional stability is achieved.

During the cold-working of the metal-plastic-metal laminate, mechanical stresses are formed in the metal-plastic-metal laminate. The network of uninterrupted paths through the dimensionally stable plastic creates a rigid bond between the two metal skins. As a result, the core layer is able to retain the above stresses without allowing relaxation.

The thermoplastic in the laminate preferably only has an amorphous phase. If a crystalline phase is possible as well as an amorphous phase, there is a risk that nuclei will actually form from the crystalline phase. The formation of crystalline nuclei is disadvantageous, since the density of the crystalline phase differs from the density of the amorphous phase. The difference in density results in high internal stresses in the core layer, which internal stresses readily cause deformation of the laminate.

The thermoplastic in the laminate preferably has a glass transition temperature which lies in a range from 180° C. to 240° C. This ensures that the laminate retains its dimensional stability at temperatures which are usually employed after the cold-working in a production line for bodywork parts.

The thermoplastic more preferably has a glass transition temperature which lies in a range from 200° C. to 220° C. In this way, subsequent treatments during which the temperatures rise to between 180° C. and 200° C. can be carried out while maintaining the form of the laminate as laid down by the initially imposed requirement. A laminate with a core layer comprising a thermoplastic with a glass transition temperature which is higher than the temperatures which occur during the subsequent treatment is able to withstand the treatment for a longer time while retaining its shape than a laminate in which the plastic has a lower glass transition temperature. The advantage of a glass transition temperature which is not too far above the maximum temperature of a subsequent treatment is that if desired it is also relatively easy to carry out other subsequent treatments which involve raising the temperature to above the glass transition temperature.

In one embodiment of the laminate, the thermoplastic belongs to the group of poly(phenylene ethers), including poly(2,6-dimethyl-1,4-phenylene ether), known as PPE for short. PPE satisfies the demands set out above. It has only an amorphous phase and has a glass transition temperature of approximately 220° C. If desired, a similar plastic in which the non-reactive groups on the phenylene differ from the 2,6-dimethyl structure can be used, in order, for example, to achieve a different glass transition temperature.

The core layer of the metal-plastic-metal laminate preferably has a thickness in a range from 0.5 to 2.5 mm. The result is a metal-plastic-metal laminate in which the metal skins are sufficiently separate from one another to produce the required rigidity of the laminate. Compared to a metal sheet of the same rigidity as the corresponding metal-plastic-metal laminate, the corresponding metal-plastic-metal laminate is lighter, since the core layer has a relatively low density. The thickness is more preferably in a range from 0.5 to 1.0 mm. The result is a metal-plastic-metal laminate which is sufficiently rigid to satisfy the requirements for bodywork parts for cars, for example, in which as little plastic as possible is processed. This reduces the cost price of the metal-plastic-metal laminate.

A metal skin preferably consists of steel, galvanized steel, stainless steel or an aluminium alloy. These are materials which are already being used in vehicle bodies, so that further process steps in the production of vehicle bodies do not have to be adapted. These materials are also employed in the field of packaging production.

Certain aluminium alloys are particularly suitable for hardening by thermal means, and certain aluminium alloys are particularly suitable for work-hardening. On account of the way in which a laminate is usually produced, the aluminium alloy preferably belongs to the group of aluminium alloys which are particularly suitable for work-hardening. A better laminate is produced as a result. Examples of suitable aluminium alloys are Aluminium Association 5182, 5054, 6063 and 6016. Aluminium of this type has the appropriate hardness and properties for the intended applications. It is recommended that the laminate comprise prestretched aluminium, in order to prevent so-called Lüders lines from developing during the cold-working of the laminate.

In one embodiment of the metal-plastic-metal laminate, the metal skin has a thickness in a range from 0.08 to 0.3 mm. The result is a metal-plastic-metal laminate which is eminently suitable for producing products for a wide range of applications. The thickness of the metal is preferably between 0.12 and 0.19 mm. The result is a metal-plastic-metal laminate which is eminently suitable for bodywork parts in, for example, the automotive industry.

In one embodiment of the laminate, the laminate comprises an adhesion layer between the core layer and the metal skin. This improves the adhesion between the core layer and a metal skin, in order to provide a laminate for applications in which better adhesion is desirable. Moreover, improved adhesion between the core layer and the metal skin contributes to improving the dimensional stability of the laminate as a whole.

In an embodiment in which the core layer comprises a thermoplastic which belongs to the group of poly(phenylene ethers), the adhesion layer preferably belongs to the group of polyurethanes (PUR). Unlike epoxy resin, for example, PUR adheres well to poly(phenylene ethers).

The invention is also embodied in a laminate comprising a plastic layer which contains a thermoplastic, which plastic layer is joined on one side to a substantially parallel metal skin, wherein the plastic layer furthermore comprises a solvent and a hardener, the thermoplastic being dissolved in the solvent, and the hardener being capable of reaction with the solvent; and the invention is also embodied in a laminate comprising a plastic layer which contains a thermoplastic, which plastic layer is joined on one side to a substantially parallel metal skin, wherein the plastic layer comprises polymer particles which are dispersed in the thermoplastic, which polymer particles are formed from a solvent and a hardener which is capable of reaction with the solvent.

A laminate of a plastic layer joined on one side to a metal skin, can be designed and manufactured such that the mechanical strength is provided mainly by the plastic, whereas the outside appearance of the laminated product is metal like. For this purpose a metal skin being a metal foil having a thickness of between 0.020 mm and 0.080 mm is sufficient. Such a laminate is, amongst other applications, very suitable for manufacturing an automobile bumper.

The above described technical features with respect to composition and treatment of the thermoplastic containing core layer of the metal-plastic-metal laminate according to above described perferred embodiments of the invention, and the choice of metals of the metal-plastic-metal laminate according to above described perferred embodiments of the invention, are also preferred technical features for the laminates wherein, instead of the plastic layer being situated between two metal skin layers, the plastic layer is joined to a substantially parallel metal skin on one side only leaving the other side substantially free of a skin, or wherein the plastic layer is situated between a metal skin and a non-metallic skin or a body comprising a non-metallic material. The non-metallic material may be another plastic, or wood, or glass.

In a further aspect, the invention relates to a process for producing a laminate comprising a thermoplastic containing layer that is joined at least on one side to a substantially parallel metal skin, including a metal-plastic-metal laminate. According to the invention, the process comprises the steps of:

i. providing granules of a thermoplastic, a solvent and a hardener, which hardener is capable of reaction with the solvent;
  ii. dissolving the granules in the solvent, and adding the hardener to form a mixture;
  iii. extruding the mixture in order to achieve a sheet form;
  iv. forming a laminate comprising a layer of the extruded mixture and at least one substantially parallel metal skin.

As a result of the thermoplastic being dissolved in a solvent, the viscosity at a specific processing temperature becomes lower than the viscosity of the thermoplastic itself. As a result, the core layer with the dissolved thermoplastic can be processed and extruded more successfully at lower temperatures than a core layer comprising undissolved plastic. It is now possible to select a thermoplastic with a high glass transition temperature for production of a laminate, during which certain steps involved in production may nevertheless take place at a low temperature.

It is remarked that this process is understood to include a process for the production of the metal-plastic-metal laminate according to the invention, wherein step iv amounts to forming a metal-plastic-metal laminate comprising a core layer of the extruded mixture.

Dimensional stability of the laminate can also be achieved at higher temperature. For this purpose, one embodiment of the process furthermore comprises the steps of:

v. heating the laminate in order to make the hardener react with the solvent; and
  vi. cooling the laminate to a processing temperature.

This terminates the dissolving function of the solvent, since the low molecular weight epoxy resin and the hardener together form a polymer. Then, the cooling causes the core layer to adopt a desired dimensional stability. Preferably, the laminate is thus suitable for cold-working while having sufficient dimensional stability to be subjected to a conventional coating treatment after the cold-working, without mechanical stresses which have built up in the laminate relaxing.

The heating of the laminate in order to make the hardener react with the solvent is preferably carried out at the same time as the formation of the laminate. The result is that a dimensionally stable laminate is produced using a quicker and easier production process. The laminate obtained in this way can still be cold-worked to form a product, but the shape of the product remains stable during subsequent heat treatments.

A further advantage of forming the laminate at the same time as carrying out the reaction between the solvent and the hardener is that the hardener and/or the solvent is/are thus also available for bonding to the surface of a metal skin. As a result, the core layer adheres to a metal skin with the aid of these constituents, so that it is possible to dispense with the need to apply a separate adhesion layer between the core layer and the metal skin.

In another embodiment of the process, step v is carried out before step iv but after step iii. The result is an intermediate product of a hardened, extruded sheet, which can subsequently be processed to form a laminate.

The reaction between the hardener and the solvent preferably takes place at a temperature which is higher than the glass transition temperature of the thermoplastic. Since the viscosity of the plastic falls as the temperature rises, mass transfer and diffusion processes in the plastic are accelerated, so that a thermally and/or chemically induced phase separation between the plastic and the reaction product becomes possible. As a result, polymer particles are formed, it being possible for the polymer particles to be dispersed within the plastic.

In one specific embodiment, the plastic is selected from the group of poly(phenylene ethers), such as PPE, and the solvent is selected from the group of low molecular weight epoxy resins, and the hardener is selected from the group consisting of amines, amides and anhydrides.

PPE only has a amorphous phase and has a glass transition temperature of approximately 220° C.

Epoxy resins adhere well to metal surfaces. Moreover, it is likely that during the hardening the epoxy resin preferentially binds in the vicinity of the metal surface. Both aromatic resins (for example bisphenol-A-diglycidyl ether, BADGE) and aliphatic resins (for example polypropylene oxide diglycidyl ether, PPODGE), as well mixtures thereof, can be used. The aromatic epoxy resins are harder than the aliphatic epoxy resins and, in addition, less expensive.

Amines, amides and anhydrides are widely commercially available at favourable prices. Hardeners of this type react excellently with epoxy groups. The temperature and rate at which these hardeners react with the epoxy groups depend, inter alia, on the type of hardener, so that it is possible to provide a suitable laminate for various types of applications. Both aromatic amines (for example 4,4'-methylene-bis(2,6-diethylaniline) M-DEA, or 4,4'-methylene-bis(3-chloro-2,6-diethylaniline) M-CDEA), and aliphatic amines (for example propylene oxide diamine PODA or polypropylene oxide diamide), as well as mixtures, can be used. Aromatic compounds are slower on account of steric hindering.

The molecular weight of the poly(phenylene ether) selected is preferably between 20 000 and 30 000 atomic mass units (amu). A plastic with PPE chains of this type of length has the correct viscosity for the core layer of the laminate. Below 20 000 amu, the phase separation has been found to be too slow for the above applications. Above 30 000 amu there are in relative terms too few terminal phenolic groups. However, these terminal groups are desirable, since they are able to react with the epoxy particles, resulting in secure anchoring between the epoxy particles and the plastic, which is of benefit for the adhesion of the core layer to the metal skins. Moreover, the viscosity of the mixture becomes too high at a high molecular weight, thus reducing the applicability and extrudability at a defined temperature.

The mixture preferably comprises between 60 and 80% by weight of poly(phenylene ethers). At higher percentages than 80%, the melt can no longer be sufficiently processed, while at lower percentages than 60%, the ultimately desired dimensional stability is not achieved, since an excessively large fraction of epoxy particles is dispersed in the core layer, making the plastic network less strong. The percentage of poly(phenylene ethers) in the mixture is preferably approximately 70% by weight. The result is a dimensional stability which is sufficient for the above applications, while the dissolved plastic also remains sufficiently processable and extrudable.

The extrusion of the mixture comprising PPE and epoxy resin is preferably carried out at a temperature in a range from 160° C. to 200° C., and more preferably in a range from 170° C. to 180° C. This temperature is just slightly lower than the temperature to which the laminate is subjected in a coating operation.

The temperature at which the PPE granules are dissolved in the epoxy resin preferably lies in a range from 170° C. to 200° C. The result is a homogeneous composition. A particular advantage is achieved if the extrusion is also carried out in a temperature range of this nature, since the mixing and extrusion can then be carried out in the same device.

The laminate with a PPE-containing core layer is preferably formed at a temperature which is higher than 240° C. This temperature is a good deal higher than the glass transition temperature of PPE, with the result that the plastic flows sufficiently and can bed itself snugly against the metal skin.

BRIEF DESCRIPTION OF THE DRAWINGS

The invention will now be explained with reference to the drawing, in which.

DETAILED DESCRIPTION OF THE PREFERRED EMBODIMENTS

One of the objects of the invention is to provide laminate comprising a thermoplastic containing layer, which laminate is dimensionally stable at a temperature of at least 180° C.

Many plastics exhibit a considerable fall in viscosity even at temperatures much lower than the melting point, on account of their lower glass transition temperature. One possible solution to this problem is to add substances which limit the fall in viscosity of the plastic in the temperature range around the glass transition temperature. However, this leads to unnecessarily expensive and specialist handling of plastics.

A problem with plastics having a sufficiently high dimensional stability and a sufficiently high glass transition temperature is that insufficient extrudability and processibility at a temperature which is customary in industry is inherent to a plastic of this type.

Even if a plastic having the required high dimensional stability is selected, and sufficiently high temperatures are used during the production of the laminate to process such a plastic, the plastic may burn already before it can be made sufficiently extrudable as a result of the temperature being raised to the appropriate range.

The present invention at least partly resides in that the core layer comprises, in addition to a thermoplastic, a solvent and a hardener which is capable of reaction therewith. As a result, the processing range of the thermoplastic is temporarily shifted towards lower temperatures, since the dissolved plastic has a lower viscosity than the plastic itself. When the ultimately desired high dimensional stability is to be reached, according to the invention the solvent can be removed from the plastic with the aid of a polymerization reaction between the hardener and the solvent.

To do this, it is preferable to select a system of plastic and hardener/solvent in which the reaction product formed from the hardener and solvent are not miscible with the plastic. The result is a phase separation which may even involve phase inversion. As a result, the reaction product in the form of polymer particles becomes dispersed in the plastic.

Mixtures of thermoplastics of this type, and segregation thereof with the aid of chemically or thermodynamically induced phase separation, are known, for example, from the article "Processing of thermoplastic polymers using reactive solvents" by H. E. H. Meijer et al., published in 1996, in Volume 8 of "High Performance Polymers". The idea of producing a dimensionally stable laminate or metal-plastic-metal laminate from exactly such a mixture is altogether novel.

Figure 1:
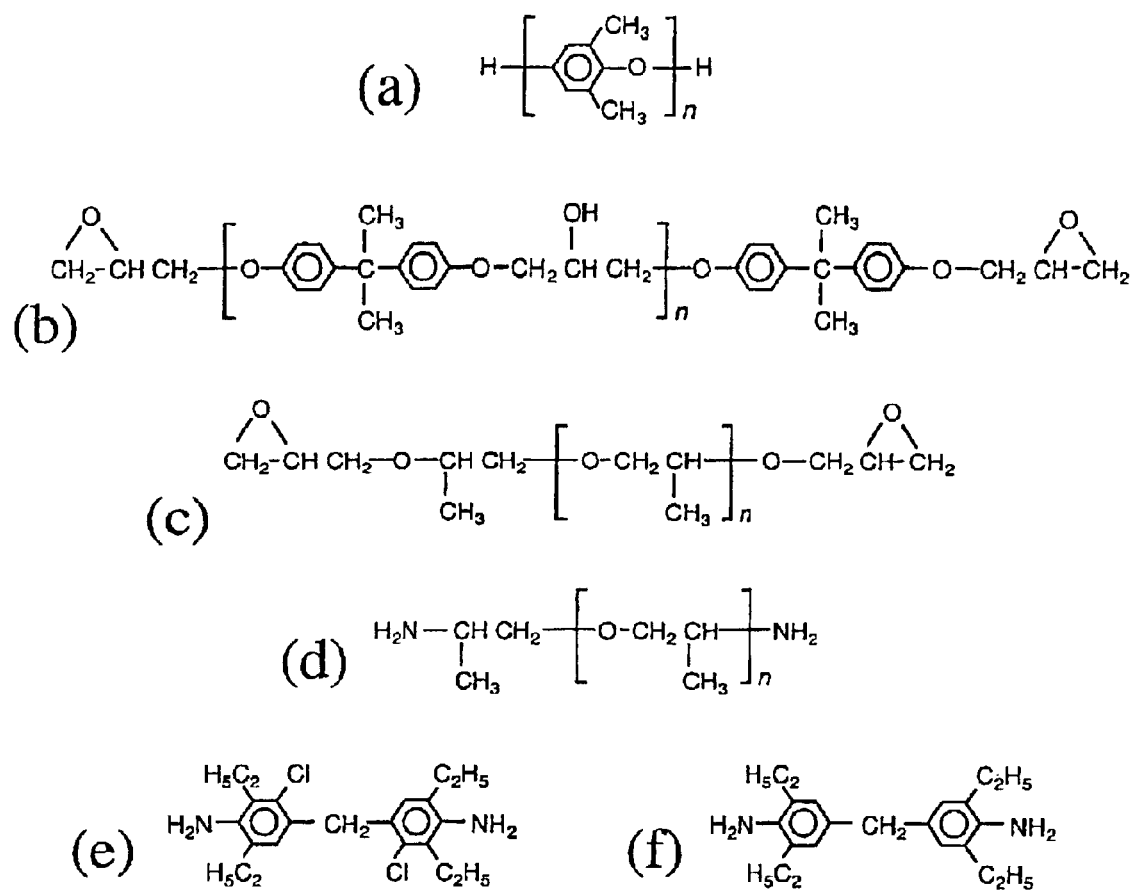
FIG. 1 provides an overview of structural formulae of some of the compounds mentioned in the description.

FIG. 1 shows an overview of structural formulae of a number of compounds which are referred to in the description. These are (a) the plastic PPE, (b) an aromatic epoxy resin BADGE, (c) an aliphatic epoxy resin PPODGE, (d) an aliphatic hardener polypropylene oxide diamine PODA, and (e), (f) aromatic hardeners M-CDEA and M-DEA.

Figures 2A, 2B:
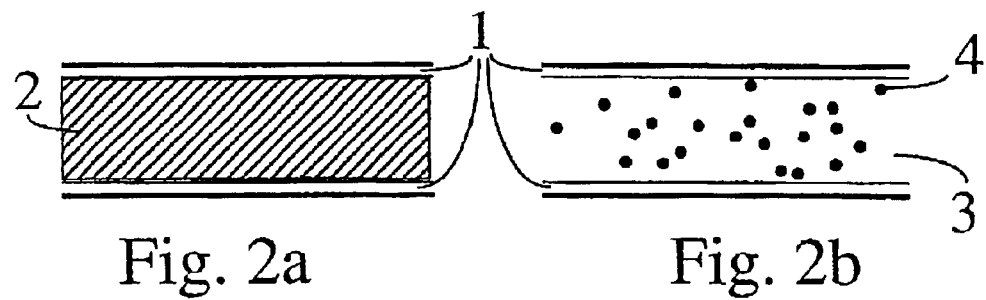
FIG. 2 diagrammatically shows a cross section through the metal-plastic-metal laminate according to the first aspect of the invention, before and after the formation of the polymer particles.

FIG. 2a diagrammatically depicts a metal-plastic-metal laminate according to the first aspect of the invention. It comprises two substantially parallel metal skins 1, between which there is a core layer 2 which is connected to the metal skins. In FIG. 2a, the core layer comprises a solution of a thermoplastic in a solvent mixed with a hardener which is capable of reaction with the solvent.

After the core layer has been heated, for example after the formation of the laminate, the hardener reacts with the solvent. Particularly at a temperature which lies above the glass transition temperature of the plastic, thermally and/or chemically induced phase separation or even phase inversion occurs, resulting in the laminate which is diagrammatically depicted in FIG. 2b. The core layer in FIG. 2b comprises a continuous plastic layer 3, in which the polymer particles 4 formed from the solvent and the hardener are dispersed.

In other embodiments of the invention, only one side of the plastic layer that is shown in FIGS. 2a and 2b is joined to a metal skin layer. In yet another embodiments of the invention, one of the metal skin layers shown in FIGS. 2a and 2b is replaced by a non-metallic skin or a body comprising a non-metallic material.

According to the invention, in particular poly(phenylene ethers), such as PPE, are preferred as the thermoplastic base for the core layer. On the one hand, it is desired for the molecular weight of the poly(phenylene ethers) to be as high as possible, since a high molecular weight promotes the phase separation of the hardener/epoxy particles formed. However, a certain fraction of terminal phenolic groups is also desirable, since they can bind themselves to the epoxy particles. This typically occurs at a temperature of approximately 200° C. The adhesion of the core layer to the metal skins is improved as a result. Moreover, the viscosity of poly(phenylene ethers) of lower molecular weight is lower, so that less solvent is required to achieve the same viscosity and it is possible for a higher fraction of the core layer to be formed from the poly(phenylene ethers) with the high dimensional stability. It has been found that a molecular weight of between 20 000 and 30 000 amu gives good results for the abovementioned applications.

In addition to poly(phenylene ethers), various types of polyamides also exhibit a sufficiently high dimensional stability at a temperature of between 180° C. and 200° C. in order, if desired, to be suitable for consideration as the base material. However, for bodywork applications, it is preferable to use PPE types, since they have a higher moisture resistance than the said polyamides.

Many plastics have both an amorphous phase and a crystalline phase. When the amorphous phase is transformed to a crystalline phase, the result is local density differences in the plastic, leading to internal stresses. It is possible to counteract the formation of crystalline nuclei and the growth of this phase as far as possible with the aid of additives, but according to the invention it is preferable to select a plastic which does not have a crystalline phase.

In particular for the production of a metal skin comprising laminate, the use of an epoxy resin as solvent has a particular advantage, since it has been found that the epoxy particles bind themselves preferentially in the vicinity of a metal surface, during which process they also adhere to the metal surface. Therefore, even after they have been removed from the thermoplastic as solvent, they form an important constituent of the core layer, since they promote the adhesion of the core layer and the metal. Consequently, it is unnecessary to arrange an additional adhesion layer between the core layer and a metal skin, leading to reduced production costs.

The amount of hardener which is preferably present in the mixture is usually adapted in approximately stoichiometric proportions to the amount of reactable solvent. If desired, it is possible to deviate from these proportions. It has been found that, particularly in the case of aromatic compounds, a proportion of the hardener is absorbed in the plastic and is therefore not available for bonding with the solvent. In such cases, it is recommended to adjust the mixing ratio accordingly. Typical glass transition temperatures of polymer particles formed from epoxy resin and amines are around 180° C., depending on the degree of crosslinking.

To produce the laminate according to an embodiment of the invention, granules of the desired thermoplastic particles are dissolved. In practice, this can be carried out in a twin-screw extruder, for example. In the case of PPE and epoxy resin, this most suitably takes place at a temperature of between 170° C. and 200° C. In the case of difunctional epoxy resin, an amount of between 10 and 20% by weight will create a sufficiently low viscosity. When a homogeneous composition has been reached, the desired, approximately stoichiometric amount of hardener can be added to the solution, preferably just before the extrusion takes place, and then a sheet of the desired thickness and width is extruded. In the case of PPE/epoxy resin/amine, this takes place at a temperature of between 160° C. and 200° C.

The extruded sheet can then be hardened further, resulting in a marketable intermediate being created. However, for the desired laminate, it is advantageous for the extruded sheet further to be laminated with one or two metal skins before the thermoplastic containing layer has completely hardened.

The mean dimension of the epoxy particles which are dispersed in the PPE network lies in a range from 0.5 to 1 $\mu$m when using a mixture containing 10% difunctional epoxy resin, and in a range from 1.5 to 3 $\mu$m when using a mixture containing 20% difunctional epoxy resin. When using a specific amount of epoxy resin, the number and dimension of the epoxy particles is dependent on the extent of phase separation achieved. Both the temperature to which the extruded mixture is heated in order to make the hardener react with the epoxy resin and the time for which the mixture is held at this temperature are decisive factors in a given system of PPE/epoxy resin/hardener for the extent of phase separation and therefore the toughness of the core layer.

The metal skins preferably consist of steel, galvanized steel, stainless steel or an aluminium alloy, or combinations thereof. It is thus possible to create a laminate of which one metal skin consists of high-grade stainless steel while the "reverse side" of the metal-plastic-metal laminate consists of a less expensive steel grade.

When using an aluminium alloy, an aluminium alloy of a type which is particularly appropriate for work-hardening is particularly suitable for the laminate. An alloy which is suitable for hot-hardening is less suitable, on account of the process normally used to produce the laminate.

In one embodiment of the laminate, the aluminium alloy belongs to the AA5xxx or the AA6xxx series, such as, without being restricted to, 5182, 5054, 6063 and 6016. Aluminium of this type has the right strength and properties for the intended applications. It is recommended for the laminate to comprise prestretched aluminium, to prevent so-called Lüders lines from developing during the cold-working of the laminate.

It has been found that a steel-plastic-steel laminate with layer thicknesses of 0.13/0.65/0.13 mm, respectively, represents an excellent replacement for 0.70 mm thick steel. At least a PPE/epoxy particles system is suitable as a plastic. There is an associated considerable reduction in weight. 0.8 or 0.9 mm steel can be replaced by a steel-plastic-steel laminate, with respective thicknesses of 0.15/0.80/0.15, and 1.0 mm steel can be replaced by a steel-plastic-steel laminate with thicknesses of 0.18/0.9/0.18.

A laminate having a thermoplastic layer that is on one side substantially uncovered, may be somewhat thicker, for instance up to 5 mm, or up to 2 mm, because of the strength that must be delivered.

It will be clear to the person skilled in the art that these replacement laminates serve only as an extra indication of how the invention can be embodied, and that laminates in which the thickness of one or both metal skins differs from these examples also fall within the scope of protection of the claims.

What is claimed is:

1. Metal-plastic-metal laminate, comprising a core layer which contains a thermoplastic, which core layer is situated between two substantially parallel metal skins and is joined thereto, wherein the core layer furthermore comprises a solvent and a hardener, the thermoplastic being dissolved in the solvent, and the hardener being capable of reaction with the solvent, wherein the reaction product which can be formed from the solvent and the hardener is not miscible with the thermoplastic, wherein the thermoplastic has a glass transition temperature which lies in a range from 180° C. to 240° C., wherein at least one metal skin is selected from the group consisting of steel, galvanized steel, stainless steel and an aluminium alloy.

2. Laminate according to claim 1, wherein the solvent and the hardener each comprise at least two reactable groups for the solvent to be reactable with the hardener to form polymer as the reaction product.

3. Laminate according to claim 1, wherein the solvent comprises low molecular weight epoxy resin.

4. Laminate according to claim 3, wherein the hardener is selected from the group consisting of amines, amides and anhydrides.

5. Metal-plastic-metal laminate, comprising a core layer which contains a thermoplastic, which core layer is situated between two substantially parallel metal skins and is joined thereto, wherein the core layer comprises polymer particles which are dispersed in the thermoplastic, which polymer particles are formed from a solvent and a hardener which is capable of reaction with the solvent, wherein the thermoplastic has a glass transition temperature which lies in a range from 180° C. to 240° C., wherein at least one metal skin is selected from the group consisting of steel, galvanized steel, stainless steel and an aluminium alloy.

6. Laminated according to claim 1, wherein the thermoplastic has only an amorphous phase.

7. Laminate according to claim 1, wherein the thermoplastic is selected from the group consisting of poly (phenylene ethers).

8. Laminate according to claim 1, wherein the core layer has a thickness in a range from 0.5 to 2.5 mm.

9. Laminate according to claim 1, wherein the aluminium alloy belongs to the group of aluminium alloys which are suitable in particular for work-hardening.

10. Metal-plastic-metal laminate, comprising a core layer which contains a thermoplastic, which core layer is situated between two substantially parallel metal skins and is joined thereto, wherein the core layer furthermore comprises a solvent and a hardener, the thermoplastic being dissolved in the solvent, and the hardener being capable of reaction with the solvent, wherein the reaction product which can be formed from the solvent and the hardener is not miscible with the thermoplastic, wherein the thermoplastic has a glass transition temperature which lies in a range from 180° C. to 240° C., wherein the metal skin has a thickness in a range from 0.08 to 0.3 mm.

11. Laminate according to claim 1, wherein the laminate comprises an adhesion layer between the core layer and the metal skin.

12. Laminate according to claim 11, wherein the core layer comprises a thermoplastic which belongs to the group of poly(phenylene ethers), wherein the adhesion layer belongs to the group of polyurethanes (PUR).

13. Laminate comprising a plastic layer which contains a thermoplastic, which plastic layer is joined on one side to a substantially parallel metal skin, wherein the plastic layer furthermore comprises a solvent and a hardener, the thermoplastic being dissolved in the solvent, and the hardener being capable of reaction with the solvent, wherein the reaction product which can be formed from the solvent and the hardener is not miscible with the thermoplastic, wherein the thermoplastic has a glass transition temperature which lies in a range from 180° C. to 240° C., wherein the plastic layer is joined on the other side to a non-metallic skin or body, formed into a bodyworks part for an automobile.

14. Process for producing a laminate of claim 1, comprising the steps of:
  i. providing granules of a thermoplastic, a solvent and a hardener, which hardener is capable of reaction with the solvent;
  ii. dissolving the granules in the solvent, and adding the hardener to form a mixture;
  iii. extruding the mixture in order to achieve a sheet form;
  iv. forming a laminate comprising a layer of the extruded mixture and at least one substantially parallel metal skin.

15. Process according to claim 14, comprising the further steps of
  v. heating the laminate in order to make the hardener react with the solvent, and
  vi. cooling the laminate to a processing temperature.

16. Process according to claim 15, wherein steps iv and v are carried out simultaneously.

17. Process according to claim 14, wherein the following step is included after step iii and before step iv:
  v. heating the extruded mixture in order to make the hardener react with the solvent.

18. Process according to claim 15, wherein the temperature in step v is higher than the glass transition temperature of the thermoplastic.

19. Process according to claim 14, wherein the laminate is formed at a temperature which is higher than the glass transition temperature of the thermoplastic.

20. Process according to claim 14, wherein the plastic is selected from the group consisting of poly(phenylene ethers), and the solvent is selected from the group consisting of epoxy resins, and the hardener is selected from the group consisting of amines, amides and anhydrides.

21. Process according to claim 20, wherein the molecular weight of the poly(phenylene ether) selected is between 20 000 and 30 000 atomic mass units.

22. Process according to claim 20, wherein between 60 and 80% by weight of the mixture comprises poly (phenylene ethers).

23. Process according to claim 20, wherein the temperature at which the mixture is extruded in step iii lies in a range from 160° C. to 200° C.

24. Process according to claim 20, wherein the temperature at which the granules are dissolved in step ii lies in a range from 170° C. to 200° C.

25. Process according to claim 20, wherein the temperature at which the laminate is formed is higher than 240° C.

26. Laminate according to claim 1, wherein the thermoplastic has a glass transition temperature which lies in a range from 200° C. to 220° C.

27. Laminate according to claim 1, wherein the thermoplastic includes PPE: poly(2, 6-dimethyl-1, 4-phenylene ether).

28. Laminate according to claim 1, wherein the core layer has a thickness in a range from 0.5 to 1.0 mm.

29. Laminate according to claim 1, wherein the metal skin has a thickness in a range from 0.12 to 0.19 mm.

30. Process according to claim 20, wherein approximately 70% by weight of the mixture comprises poly(phenylene ethers).

31. Process according to claim 20, wherein the temperature at which the mixture is extruded in step iii lies in a range from 170° C. to 180° C.

32. Laminate according to claim 1, formed into a bodyworks part for an automobile.

33. Laminate according to claim 1, wherein the core layer is situated between the two substantially parallel metal skins and is directly joined thereto.

34. Laminate according to claim 13, wherein the plastic layer is directly joined on one side to the substantially parallel metal skin.

35. Laminate comprising a plastic layer which contains a thermoplastic, which plastic layer is joined on one side to a substantially parallel metal skin, wherein the plastic layer furthermore comprises a solvent and a hardener, the thermoplastic being dissolved in the solvent, and the hardener being capable of reaction with the solvent, wherein the reaction product which can be formed from the solvent and the hardener is not miscible with the thermoplastic, wherein the thermoplastic has a glass transition temperature which lies in a range from 180° C. to 240° C., wherein the metal skin has a thickness in a range from 0.08 to 0.3 mm.

* * * * *